: 3,423,409
Patented Jan. 21, 1969

3,423,409
TRIAZINES
Herbert Morton Blatter, Irvington, N.J., assignor to Ciba Corporation, New York, N.Y., a corporation of Delaware
No Drawing. Filed Nov. 1, 1965, Ser. No. 505,981
U.S. Cl. 260—248                    11 Claims
Int. Cl. C07d 55/10; A01n 9/22

ABSTRACT OF THE DISCLOSURE

Stable free dihydro-1,2,4-triazinyl radicals, e.g., those of the formula

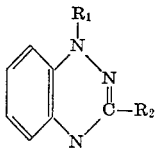

$R_{1,2}$=aryl, e.g., phenyl are useful polymerization inhibitors. Corresponding quaternaries are useful disinfectants.

---

The present invention concerns and has for its object the provision of free and relatively stable dihydro-1,2,4-triazinyl radicals, quaternaries thereof and methods for their preparation.

More particularly it relates to compounds having the Formula I

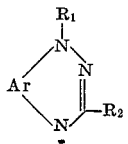

in which Ar stands for an ortho-arylene radical and each of $R_1$ and $R_2$ for an aryl radical, their salts and the quaternary oxidation products thereof.

The arylene radical Ar and the aryl radicals $R_1$ and $R_2$ represent, for example, a mono- or polycyclic, carbocyclic or heterocyclic arylene or aryl radical respectively, preferably such containing at most three rings, each of it may contain one hetero atom, especially a sulfur atom, such as 1,2-phenylene, 1,2- or 2,3-naphthylene, 4,5- or 5,6-benzthiophenylidene, 1,2- or 2,3-anthracenylidene, 9,10-phenanthrenylidene, 2,3-dibenzthiophenylidene or 4,5-naphtho [2,1-b]thiophenylidene and the corresponding aryl radicals bound in any position available for substitution.

These radicals Ar, $R_1$ and $R_2$ may be unsubstituted or substituted by one or more than one of the same or of different substituents, such as lower alkyl, e.g., methyl, ethyl, n- or i-propyl, n-, i-, sec. or tert. butyl, lower alkoxy, e.g., methoxy, ethoxy, n-propoxy or n-butoxy, halogen, e.g., fluoro, chloro or bromo, trifluoromethyl or nitro.

Ar preferably stands for 1,2-phenylene, (lower alkyl)- 1,2-phenylene, (lower alkoxy)-1,2-phenylene, (halogeno)- 1,2-phenylene and (nitro)-1,2-phenylene and each of $R_1$ and $R_2$ for phenyl, (lower alkyl)-phenyl, (lower alkoxy)- phenyl, (halogeno)-phenyl, (nitro)-phenyl, thienyl and (lower alkyl)-thienyl.

Preferred quaternary oxidation products of the invention are those of the formula

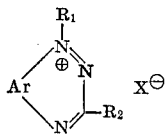

in which $X^\ominus$ stands for an anion, especially that of a mineral acid.

The compounds of the invention possess valuable properties, especially the intensively colored free radicals. They are useful as polymerization inhibitors, and photographic sensitizers. The quaternary salts exhibit antibacterial and antifungal properties and are useful as disinfectants.

The compounds of the invention are prepared by oxidation of the corresponding dihydro-1,2,4-triazines, such as those of the Formula II

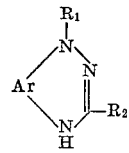

or their tautomeric forms.

Said oxidation to the free radical easily takes place, especially in an acidic or alkaline medium, but also in neutral solution. Usually, the oxygen present in the air and/or solvent used is sufficient to convert the starting material into the free radical. This is most surprising since, according to the prior art, oxygen usually combines with free radicals to form peroxides. Therefore, the use of an additional oxidation agent in most instances is unnecessary; the starting material may be allowed to stand under air at room temperature for some time, e.g., from several hours to a couple of days, advantageously in the presence of an acidic or alkaline agent, such as a mineral acid, e.g., a hydrohalic acid, or an alkali metal hydroxide, e.g., sodium or potassium hydroxide. Under more drastic oxidation conditions and in the presence of an anion releasing agent, the quaternaries are obtained. Useful oxidation agents for the conversion of a free radical into the corresponding quaternary salt are, for example, heavy metal salts, such as silver, mercuric or cupric salts, especially those of a mineral acid, such as a hydrohalic, sulfuric, nitric or perchloric acid.

The new starting materials used in the present invention, especially those of the Formulae II (above) and III (below), are also intended to be included within its scope. They are prepared by (a) treatment of a compound having the Formula III

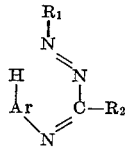

with an acid or (b) condensation of a compound having the Formula IV

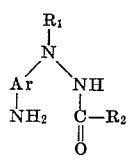

The acid used in reaction (a) advantageously is a strong acid, such as a mineral acid, for example a hydrohalic acid, e.g., hydrochloric or hydrobromic acid. The condensation of the compounds of the Formula IV may be performed either under pyrolytic conditions or with the use of condensing agents, such as carbodiimides, e.g., dicyclohexyl-carbodiimide, or any other dehydrating agents.

The intermediates for Formula III are prepared by oxidation of compounds having the Formula V

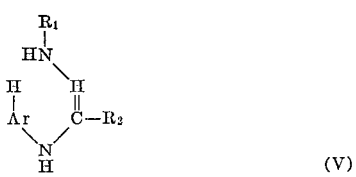

which latter may be obtained from the following compounds

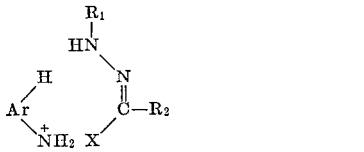

in which X stands for a halogen atom. In the above oxidation step advantageously mercuric oxide may be used as oxidation agent. The intermediates of the Formula IV can be obtained by reduction from the corresponding nitro compounds, for example, with the use of catalytically activated hydrogen.

The above processes are carried out according to standard methods, in the presence or absence of diluents, preferably such as are inert to the reagents and are solvents thereof, of catalysts, condensing agents and/or inert atmospheres, at low temperatures, room temperature or advantageously elevated temperatures at atmospheric or superatmospheric pressure.

The compounds of the invention are obtained in the free from or in the form of their salts, depending on the character of the compounds or the conditions under which the process is carried out, the salts are also included within present invention. Compounds that contain acidic groups, e.g., secondary nitrogen atoms, form metal salts, particularly alkali metal, such as sodium or potassium salts. Compounds that contain basic groups, e.g., sec. or tert. nitrogen atoms, form also acid addition salts. These may be derived from inorganic or organic acids, for example, mineral acids, carboxylic or sulfonic acids. The conversion of the free compounds into the salts or of the salts into the free compounds or into other salts is achieved according to standard procedures, for example, with the use of acidic or alkaline agents or iron exchangers.

The invention further includes any variant of the processes disclosed in which an intermediate product obtainable at any stage of the processes is used as starting material and any remaining steps are carried out or any process is discontinued at any stage thereof or in which starting materials or intermediates are formed under the reaction conditions or in which the reaction components are used in the form of their salts. Mainly those starting materials should be used in the reactions of the invention that lead to the formation of those compounds indicated as preferred embodiments of the invention.

The following examples illustrate the invention, temperatures are given in degrees centigrade and all parts wherever given are parts by weight.

Example 1

0.75 g. 1,3-diphenyl-1,4-dihydro-1,2,4-benzotriazine are dissolved in 10 ml. ethanol and to the solution 3 ml. 2 N-ethanolic potassium hydroxide are added and the mixture is allowed to stand at room temperature for two days. The solid separated is filtered off and washed with water to yield the 1,3-diphenyl-1,4-dihydro-1,2,4-benzotriazinyl radical of the formula

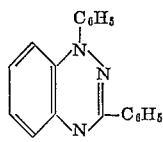

melting at 113–115°.

The starting material is prepared as follows: To 1 g. 1'-phenyl-1'-phenylimino - benzeneazomethane [Ber. 43, 3001 (1910)], 7 ml. of a saturated solution of hydrogen bromide in isopropanol are added with swirling. The mixture turns dark and the solid starts to go into solution. After two to three minutes another solid begins to precipitate on scratching. It is filtered off, washed with a small amount of acetone and recrystallized from methanol-diethyl ether to yield the 1,3-diphenyl-1,4-dihydro-1,2,4 - benzotriazine hydrobromide melting at 230–235° with decomposition.

0.95 g. thereof are placed in a separatory funnel and shaken well with an aqueous sodium bicarbonate solution and diethyl ether. When all the solid is in solution the ether layer is separated, dried and concentrated. To the concentrate n-pentane is added whereupon the 1,3-diphenyl-1,4-dihydro - 1,2,4 - benzotriazine crystallizes, it melts at 105–107°.

Example 2

To 7.0 g. 1'-phenyl-1'-(4-bromo-phenyl)-imino-benzeneazomethane 49 ml. of a saturated solution of hydrogenbromide in isopropanol are added with swirling. The reaction mixture turns black and gets warm. It is allowed to cool to room temperature and is then filtered. The residue is washed with a little acetone and recrystallized from methanol-diethyl ether to yield the dark brown 1,3-diphenyl-7-bromo-1,4-dihydro - 1,2,4 - benzotriazinyl hydrobromide radical of the formula

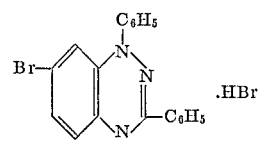

melting at 236–239°.

From the filtrate obtained, some of the 1,3-diphenyl-7-bromo-1,4-dihydro-1,2,4-benzotriazine hydrobromide crystallizes on cooling, which is the precursor of the above free radical. After recrystallization from methanol-diethyl ether it darkens at 210° and melts at 229–232° with decomposition.

The starting material is prepared as follows: The mixture of 8.0 g. α-chloro-benzaldehyde phenylhydrazone and 24.0 g. 4-bromo-aniline is heated until a clear dark red melt is formed. It is allowed to cool to room temperature and then poured into water. The solid separated is filtered off and recrystallized from ethanol to yield the α-(4-bromo - phenyl) - amino - benzaldehyde phenylhydrazone melting at 168–171°.

To the heated, stirred solution of 9.0 g. thereof in 250 ml. ethanol, yellow mercuric oxide is added portionwise until it is no longer being reduced. After cooling the mixture is filtered and the dark red filtrate concentrated under reduced pressure. Upon cooling red crystals separate which are filtered off and recrystallized from ethanol to yield the 1'-phenyl-1'-(4-bromo - phenyl) - imino - benzeneazomethane melting at 126–128°.

Example 3

To the solution of 2.0 g. 1,3-diphenyl-7-bromo-1,4-dehydro-1,2,4-benzotriazinyl hydrobromide radical in 100 ml. ethanol, 25 ml. of a 2 N-ethanolic potassium hydroxide solution are added and the solution is allowed to stand at room temperature for two days. The solid formed is filtered off and recrystallized from ethanol to yield the 1,3-diphenyl-7-bromo-1,4-dihydro-1,2,4-benzotriazinyl radical of the formula

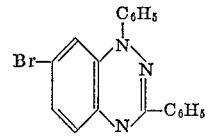

melting at 176–178°.

Example 4

To the solution of 0.142 g. 1,3-diphenyl-1,4-dihydro-1,2,4-benzotriazinyl radical in 10 ml. ethanol 0.085 g. silver nitrate in 10 ml. ethanol are added while swirling. The color of the reaction mixture becomes lighter and silver begins to separate. After standing for about one hour it is filtered, the yellow filtrate evaporated under reduced pressure and the residue recrystallized from methanol-diethyl ether to yield the 1,3-diphenyl-1,2,4-benzotriazinium nitrate of the formula

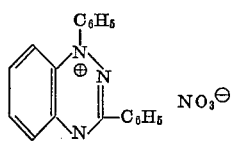

darkening at 195° and melting at 208–210° with decomposition.

Example 5

0.5 g. 1-(4-methyl-phenyl)-3-phenyl-6-methyl-1,4-dihydro-1,2,4-benzotriazine are dissolved in 10 ml. N-ethanolic potassium hydroxide while swirling. After 2 to 3 minutes a dark solid begins to separate which is filtered off after about 10 minutes, washed with water and recrystallized from ethanol to yield the 1-(4-methyl-phenyl)-3-phenyl-6-methyl-1,4-dihydro-1,2,4-benzotriazinyl radical of the formula

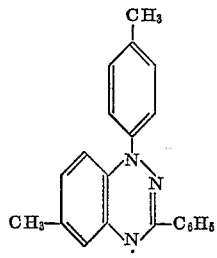

melting at 123–125°.

The starting material is prepared as follows: The mixture of 4.4 g. lithium aluminum hydride and 100 ml. anhydrous diethyl ether is refluxed for 1 hour under nitrogen, then filtered through glass wool into an addition funnel. It is then added slowly to the solution of 22.6 g. di-(4-methyl-phenyl)-nitrosoamine in 600 ml. anhydrous diethyl ether at 10° while stirring. Hereupon the mixture is stirred at 10° for 1 hour and then decomposed first with wet diethyl ether, then with 200 ml. 30% aqueous sodium potassium tartrate solution. The aqueous layer is extracted with diethyl ether, the combined extracts backwashed with brine, dried and combined with a saturated solution of hydrogen chloride in isopropanol until no more solid separates. It is filtered off to yield the N,N-di-(4-methyl-phenyl)-hydrazine hydrochloride melting at 145–165° with decomposition.

To the solution of 1.24 g. thereof in 20 ml. pyridine 0.7 g. benzoyl chloride are added dropwise. The reaction mixture gets warm and is allowed to stand at room temperature for 15 minutes. It is poured into 100 ml. water, the solid formed filtered off, dried and recrystallized once from methanol to yield the benzoic acid N',N'-di-(4-methyl-phenyl)-hydrazide melting at 198–200°.

To a mixture of 0.316 g. thereof, 10 ml. methylene chloride and 6 ml. concentrated aqueous potassium hydroxide, 0.16 g. bromine in 5 ml. methylene chloride are added dropwise with stirring. After ½ hour the organic layer is separated, washed with water, dried and concentrated under reduced pressure to yield a dark residue which solidifies in diethyl ether. It is recrystallized from methanol to give white needles of benzoic acid N'-(2-bromo-4-methyl-phenyl)-N'-(4-methyl-phenyl)-hydrazide melting at 212–214°.

To the solution of 0.395 g. thereof in 25 ml. acetone, cooled in an ice bath to 3°, 0.108 g. concentrated nitric acid are added dropwise with stirring. Stirring is continued for 15 minutes, then the ice bath is removed and the reaction mixture allowed to warm up to room temperature and is stirred for ½ hour more. It is then evaporated in vacuo. The residue solidifies in diethyl ether and is recrystallized from diethyl ether to yield the benzoic acid N'-(2-bromo-4-methyl-phenyl)-N'-(2-nitro-4-methyl-phenyl)-hydrazide melting at 218–220°.

0.44 g. thereof are dissolved in 35 ml. ethanol and hydrogenated at atmospheric pressure in the presence of 0.2 g. 10% palladium-charcoal, whereby 93 ml. of hydrogen are absorbed within 1 hour and 10 minutes (theoretical uptake 98.6 ml.). The hydrogenation stops by itself, the mixture is filtered and concentrated in vacuo. The residue solidifies in ethanol-diethyl ether and is recrystallized from methanol-diethyl ether with the use of charcoal for decolorization. There is obtained the benzoic acid N'-(2-amino-4-methyl-phenyl) - N' - (4-methyl-phenyl)-hydrazide hydrobromide melting at 210–212° with decomposition.

0.5 g. thereof are dissolved in 25 ml. ethanol and the solution is refluxed for 5 hours and hereupon concentrated under reduced pressure, to yield the 1-(4-methyl-phenyl)-3-phenyl-6-methyl-1,4-dihydro-1,2,4 - benzotriazine as a dark sticky residue which does not solidify in ethanol-diethyl ether; it is used as such without further purification.

What is claimed is:

1. A member selected from the group consisting of the dihydro-1,2,4-triazinyl radical having the formula

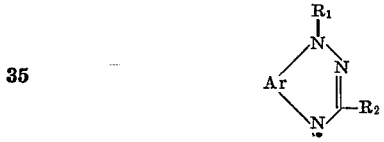

in which Ar stands for a member selected from the group consisting of 1,2-phenylene, (lower alkyl)-1,2-phenylene, (lower alkoxy)-1,2-phenylene, (halogeno)-1,2-phenylene and (nitro)-1,2- phenylene and each of $R_1$ and $R_2$ for a member selected from the group consisting of phenyl, (lower alkyl)-phenyl, (lower alkoxy)-phenyl, (halogeno)-phenyl, (nitro)-phenyl, thienyl and (lower alkyl)-thienyl, acid addition salts and oxidized quaternary salts thereof.

2. A quanternary compound as claimed in claim 1 and having the formula

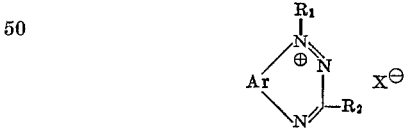

in which Ar stands for a member selected from the group consisting of 1,2-phenylene, (lower alkyl)-1,2-phenylene, (lower alkoxy)-1,2-phenylene, (halogeno)-1,2-phenylene and (nitro)- 1,2-phenylene, each of $R_1$ and $R_2$ for a member selected from the group consisting of phenyl, (lower alkyl)-phenyl, (lower alkoxy)-phenyl, (halogeno)-phenyl, (nitro)-phenyl, thienyl and (lower alkyl)-thienyl and $X^\ominus$ for the anion of a mineral acid.

3. A compound as claimed in claim 1 and being the 1,3-diphenyl-1,4-dihydro-1,2,4-benzotriazinyl radical.

4. A compound as claimed in claim 1 and being the 1,3-diphenyl-7-bromo-1,4-dihydro-1,2,4-benzotriazinyl hydrobromide radical .

5. A compound as claimed in claim 1 and being the 1,3 - diphenyl - 7 - bromo-1,4-dihydro-1,2,4-benzotriazinyl radical.

6. A compound as claimed in claim 1 and being the 1,3-diphenyl-1,2,4-benzotriazinium nitrate.

7. A compound as claimed in claim 1 and being the 1-(4-methyl-phenyl) - 3 - phenyl-6-methyl-1,4-dihydro-1,2,4-benzotriazinyl radical.

8. A member selected from the group consisting of a dihydro-1,2,4-triazine having the formula

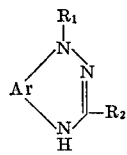

in which Ar stands for a member selected from the group consisting of 1,2-phenylene, (lower alkyl)-1,2-phenylene, (lower alkoxy)-1,2-phenylene, (halogeno)-1,2-phenylene and (nitro)-1,2-phenylene and each of $R_1$ and $R_2$ for a member selected from the group consisting of phenyl, (lower alkyl)-phenyl, (lower alkoxy)-phenyl, (halogeno)-phenyl, (nitro)-phenyl, thienyl and (lower alkyl)-thienyl, its tautomeric forms and salts of these compounds.

9. A compound as claimed in claim 8 and being the 1,3-diphenyl-1,4-dihydro-1,2,4-benzotriazine.

10. A compound as claimed in claim 8 and being the 1,3-diphenyl-7-bromo-1,4-dihydro-1,2,4-benzotriazine hydrobromide.

11. A compound as claimed in claim 8 and being the 1-(4-methyl-pheyl)-3-phenyl-6-methyl-1,4-dihydro-1,2,4-benzotriazine.

References Cited

UNITED STATES PATENTS

| | | | |
|---|---|---|---|
| 2,489,353 | 11/1949 | Wolf et al. | 260—248 |
| 2,489,358 | 11/1949 | Wolf et al. | 260—248 |

OTHER REFERENCES

Erickson et al., "The 1,2,3,- and 1,2,4-Triazines, Tetrazines and Pentazines, Interscience Pub., Inc., New York (1956), pp. 93-8.

HENRY R. JILES, *Primary Examiner.*

J. M. FORD, *Assistant Examiner.*

U.S. Cl. X.R.

260—192, 999, 558, 564; 252—401; 96—56.5